Figure 12:
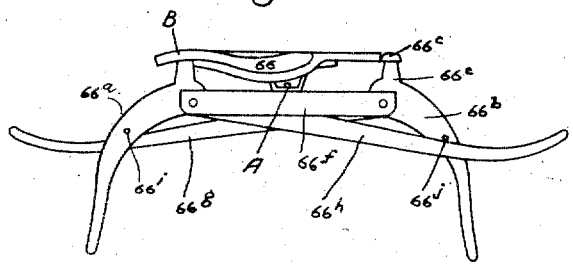

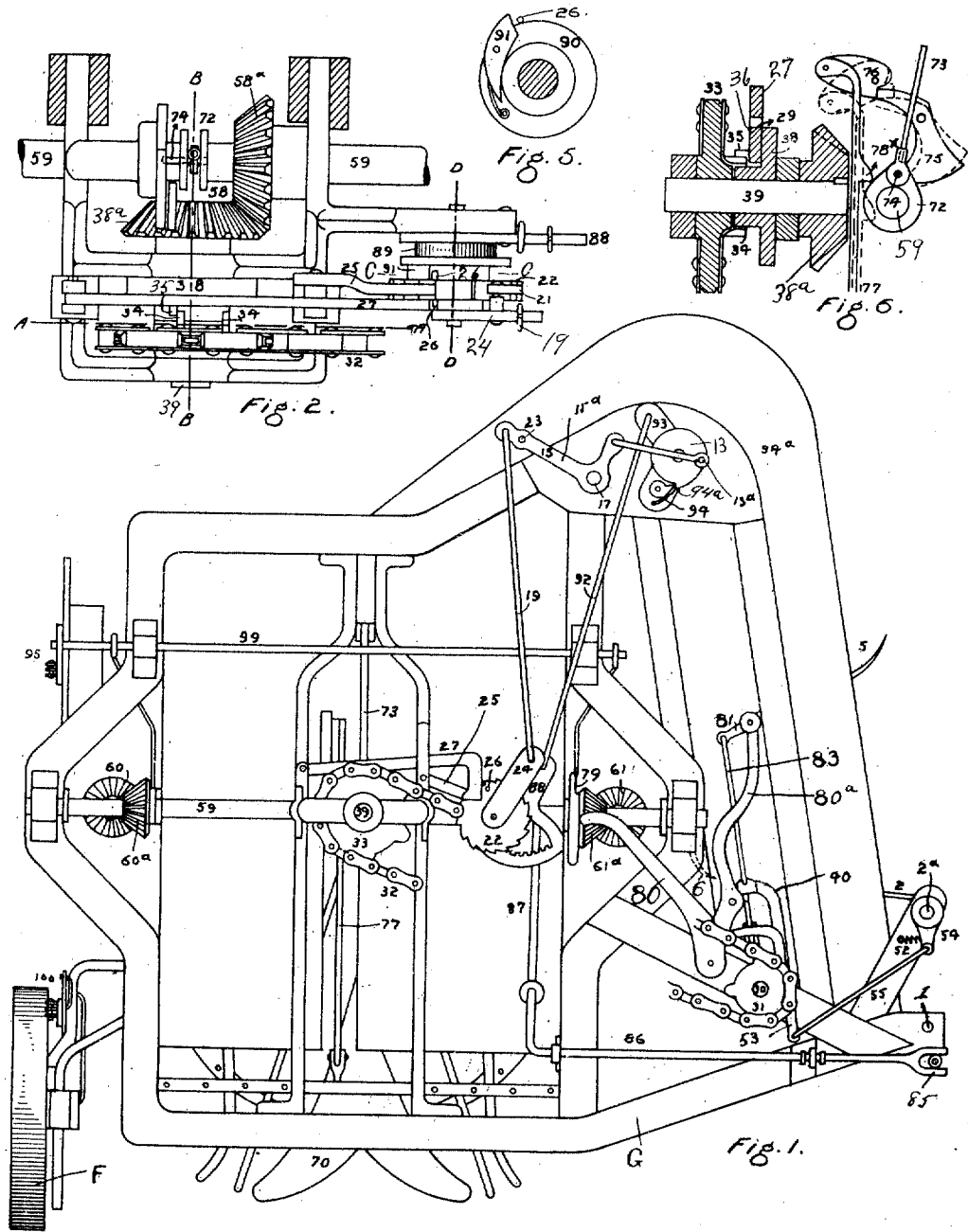

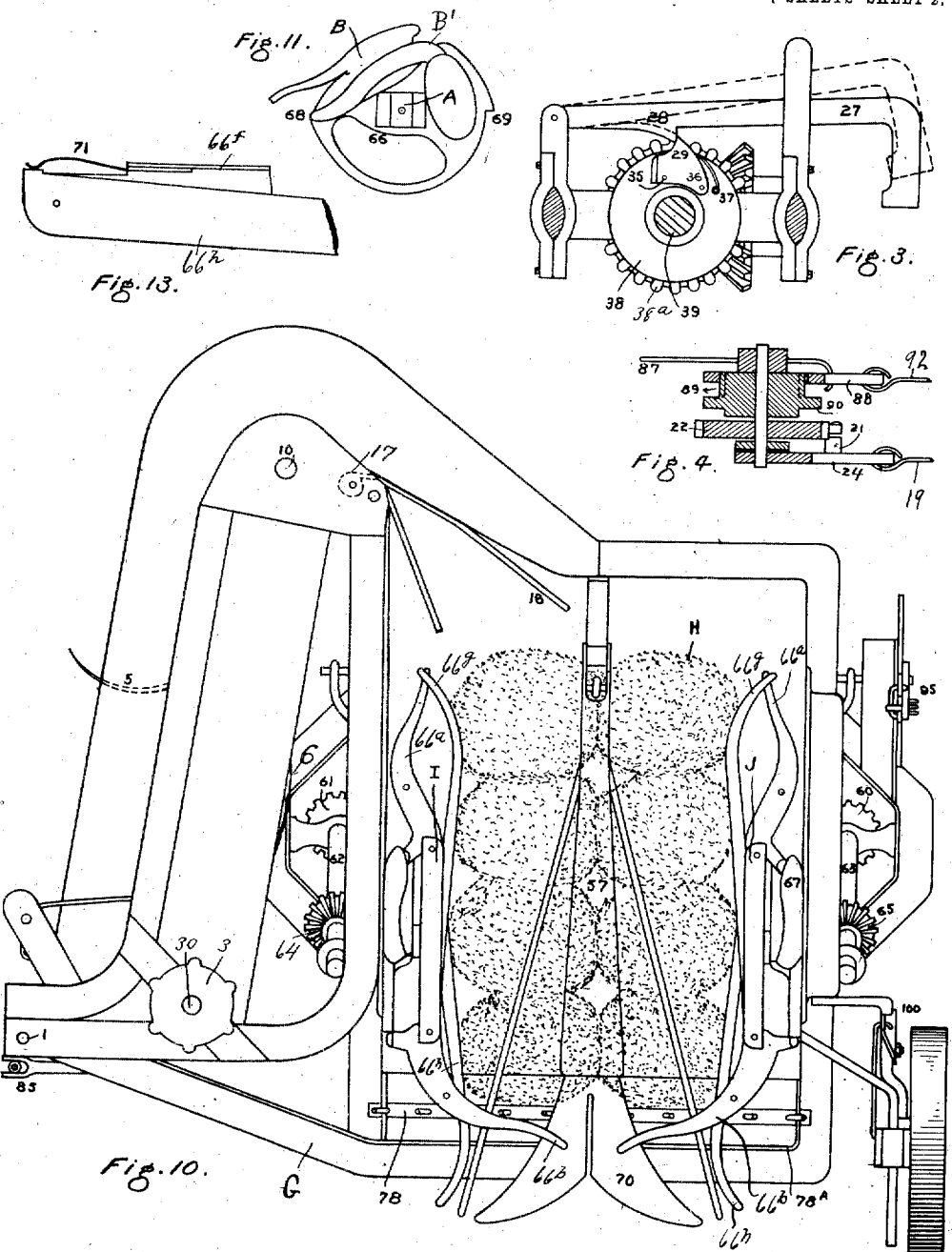

A. T. GILES.
ATTACHMENT TO GRAIN BINDERS FOR STOOKING SHEAVES OF GRAIN.
APPLICATION FILED OCT. 19, 1909.

991,294.                                          Patented May 2, 1911.
                                                      7 SHEETS—SHEET 3.

WITNESSES.                                         INVENTOR,
                                                   A. T. GILES.
                                                   ATT'Y.

A. T. GILES.
ATTACHMENT TO GRAIN BINDERS FOR STOOKING SHEAVES OF GRAIN.
APPLICATION FILED OCT. 19, 1909.
991,294.
Patented May 2, 1911
7 SHEETS—SHEET 4.
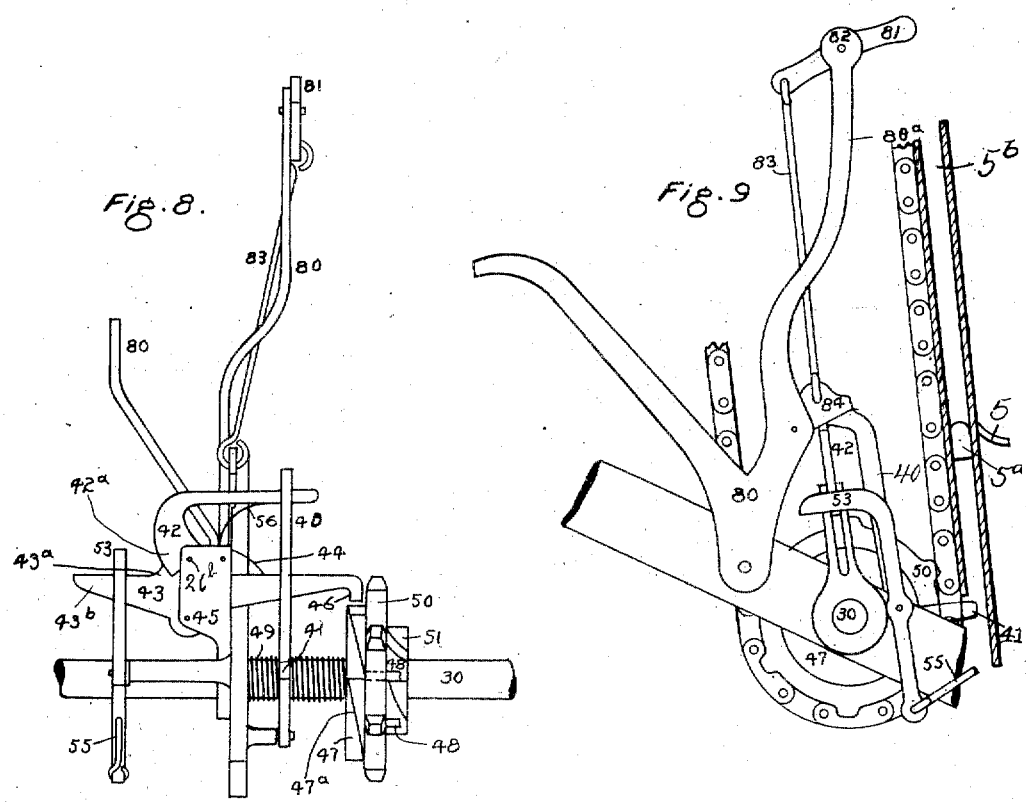

A. T. GILES.
ATTACHMENT TO GRAIN BINDERS FOR STOOKING SHEAVES OF GRAIN.
APPLICATION FILED OCT. 19, 1909.
991,294.
Patented May 2, 1911.
7 SHEETS—SHEET 5.
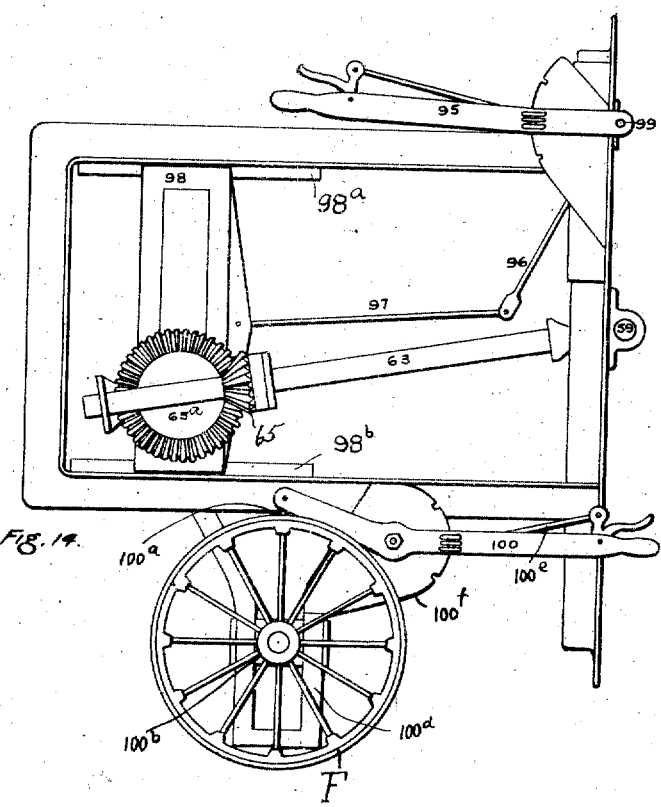
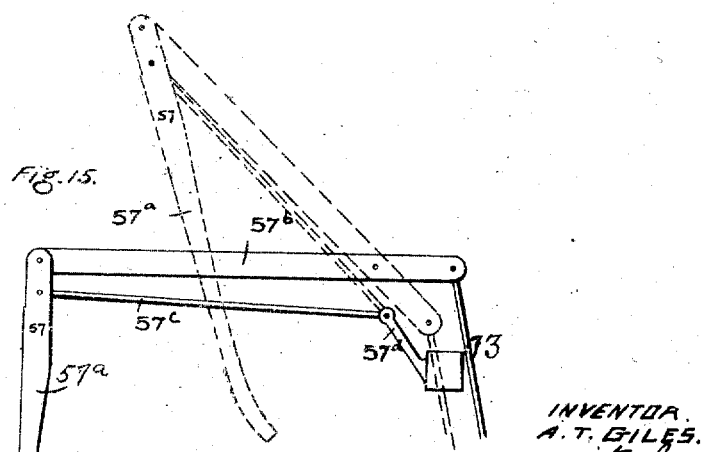

A. T. GILES.
ATTACHMENT TO GRAIN BINDERS FOR STOOKING SHEAVES OF GRAIN.
APPLICATION FILED OCT. 19, 1909.

991,294.

Patented May 2, 1911.

7 SHEETS—SHEET 6.

WITNESSES,

INVENTOR,
A. T. GILES.
BY
ATT'Y.

A. T. GILES.
ATTACHMENT TO GRAIN BINDERS FOR STOOKING SHEAVES OF GRAIN.
APPLICATION FILED OCT. 19, 1909.
991,294.
Patented May 2, 1911.
7 SHEETS—SHEET 7.
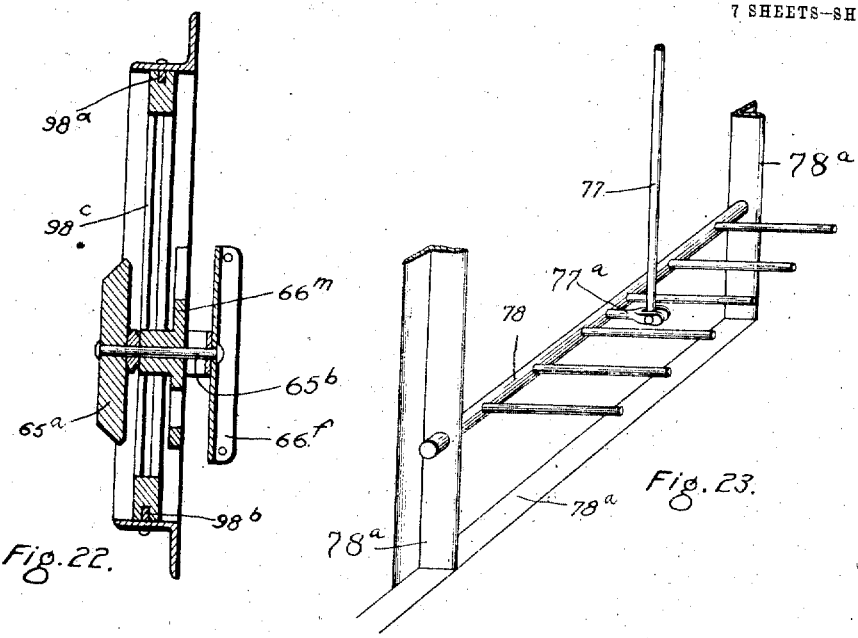
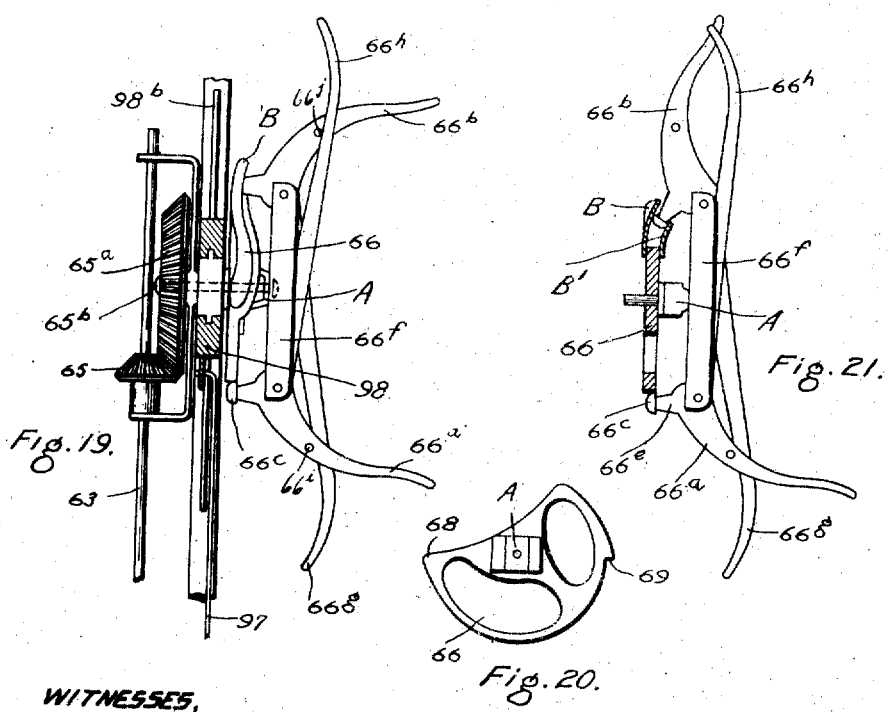
WITNESSES
INVENTOR,
A. T. GILES.
ATT'Y.

UNITED STATES PATENT OFFICE.

ALBERT THOMAS GILES, OF CALGARY, ALBERTA, CANADA.

ATTACHMENT TO GRAIN-BINDERS FOR STOOKING SHEAVES OF GRAIN.

991,294.  Specification of Letters Patent.  Patented May 2, 1911.

Application filed October 19, 1909. Serial No. 523,464.

*To all whom it may concern:*

Be it known that I, ALBERT T. GILES, of the city of Calgary, in the Province of Alberta, Canada, have invented certain new and useful Improvements in Attachments to Grain-Binders for Stooking Sheaves of Grain, of which the following is a specification.

My invention relates to improvements in attachments to grain binders for stooking sheaves of grain, and the objects of my invention are to provide an improved machine of this character which will automatically collect the sheaves as they are discharged from the binder, turn them to vertical position and discharge them in the form of a shock when a determined number of sheaves have been collected.

Particular objects of the invention are to provide an improved counting mechanism, adapted to actuate the discharge mechanism when a desired number of sheaves are in the receptacle provided for them and to provide improved means for stopping the elevator during the discharge of the sheaves, to provide improved means for turning the sheaves, to vertical position and pressing them to form a shock, to project the shock from the apparatus in a proper manner so that it will assume a vertical position on the ground, to render the various parts of the mechanism automatic in character and yet, at the same time provide means whereby the operations may be effected independently by manually operable means. These and other objects of the invention and means for carrying them out being described more fully in detail in the accompanying specification and drawings.

Figure 7:
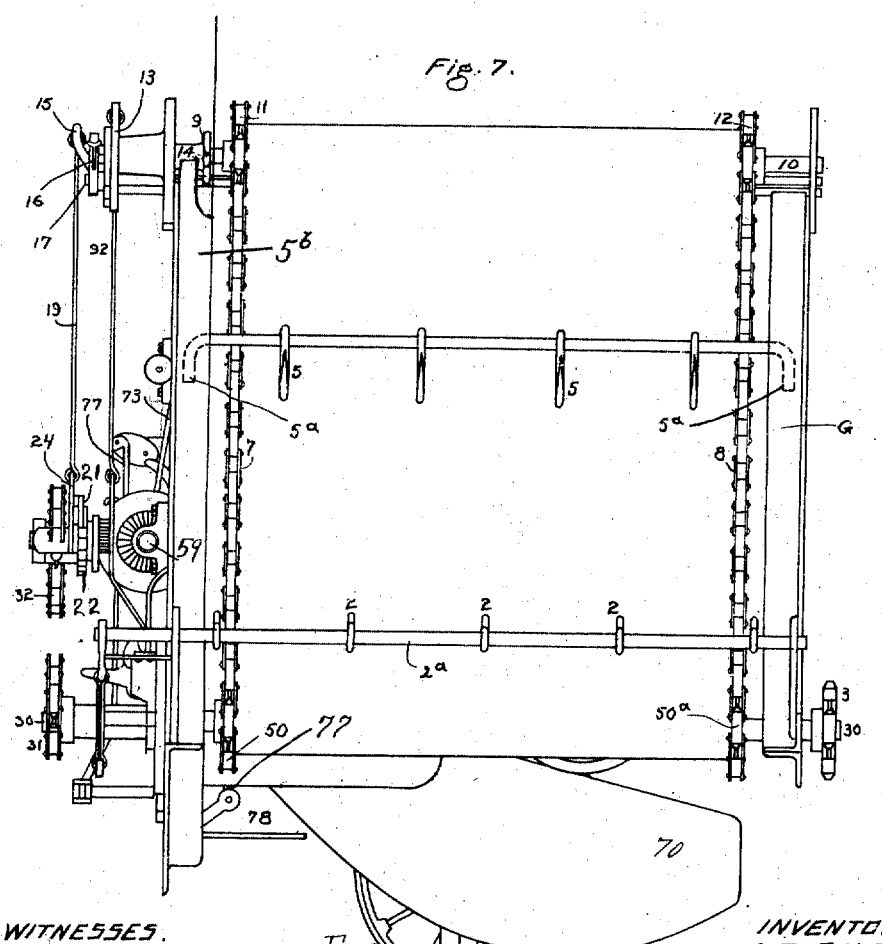
Figure 16:
Figure 17:
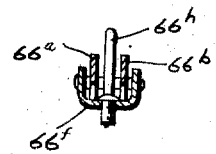
Figure 18:
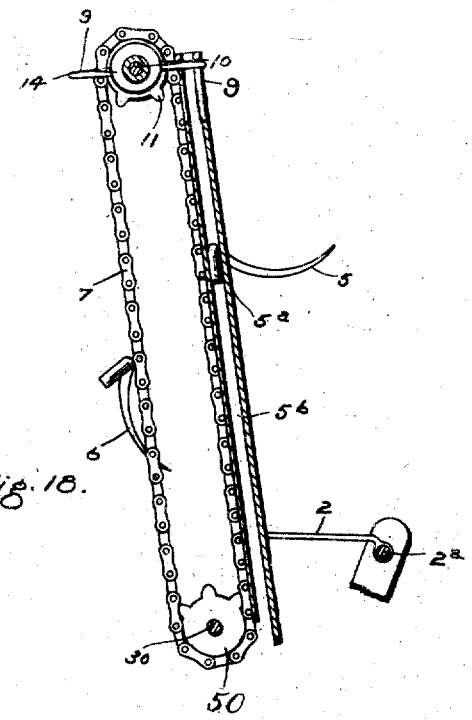

In the drawings: Figure 1 is an elevation of the machine taken from the front. Fig. 2 is a plan of the gear for the discharging mechanism. Fig. 3 is a sectional detail on the line A—A, Fig. 2. Fig. 4 is a section on the line D—D, Fig. 2. Fig. 5 is a section on the line C—C, Fig. 2. Fig. 6 is a section on the line B—B, Fig. 2. Fig. 7 is an elevation of the machine on the side adjacent to the binder platform. Fig. 8 is a side view of the clutch for automatically throwing the elevating mechanism out of gear. Fig. 9 is a front view of the mechanism as shown in Fig. 8. Fig. 10 is a rear elevation of the machine. Fig. 11 is a detail of the cam controlling the dumping fingers. Fig. 12 shows a plan of one cam and one set of dumping fingers at half stroke. Fig. 13 is a detail showing the spring for retaining the dumping fingers in normal position. Fig. 14 is an elevation of the side of the machine opposite to the binder platform and showing only those parts not already shown in the other views. Fig. 15 is a detail in elevation of the ejector arm, Fig. 16 is an elevation of the dumping fingers in horizontal position. Fig. 17 is a section on the line X—X, Fig. 16. Fig. 18 is a sectional detail through one of the guideways $5^b$. Fig. 19 is a plan partially in section of one of the pairs of fingers. Fig. 20 is a plan view of the cam for operating the fingers, with a portion of the side wings removed. Fig. 21 is a vertical section through the cam operating the dumping fingers and showing the fingers in position. Fig. 22 is a vertical section through the center of the shaft supporting and tilting the dumping fingers. Fig. 23 is a perspective view of the tiltable rack which ordinarily supports the sheaves.

Referring to the drawings, G represents the main frame of the device of suitable form to support the various elements of the mechanism and connected at one side to the binder platform and supported at the opposite side by a wheel F which may be adjusted in position by means of a lever 100 centrally fulcrumed to the frame and having a link $100^a$ connecting the same with the bearing block $100^b$ and the wheel F, the said bearing block sliding in a suitable guideway $100^d$, the lever 100 being locked in position by a suitable dog $100^e$, operating on an arcuate rack $100^f$. The opposite side of the frame to the wheel is preferably connected to the binder platform by means of a suitable link (not shown) which may engage perforations 1 in opposite sides of the frame.

To receive the sheaves as they are discharged by the ejecting mechanism of the binder a cradle is provided formed by arms 2 supported on a shaft 2ᵃ which extends transversely in front of an elevating mechanism which has two carriers 5 and 6 thereon at diametrically opposite points, the said carriers being supported by chains 7 and 8 running on upper sprockets 11 and 12 on the shaft 10 and on lower sprockets 50 and 50ᵃ on the shaft 30, the last mentioned shaft being rotated by means of a sprocket 3 which is rotated from the binder by a chain (not shown) and forms the source of power for the shocking mechanism. The carriers 5 and 6 are provided with hooks adapted to lift each sheaf off the receiving cradle, discharging it into the receptacle H formed on the sides of the frame, the said hooks being retained in extended position during upward movement only, by means of the turned ends 5ᵃ running in suitable guideways 5ᵇ in the frame.

In order to distribute the sheaves uniformly in the receptacle, it is necessary to provide means for alternately deflecting the sheaves to opposite sides. Ordinarily, the sheaves will tend to fall on the side nearest the elevator, and in order to deflect them alternately to the opposite side, an arm 9 is provided supported from a sleeve 14 on the shaft 10, the said arm being adapted to be moved through 180° by the end of the carrier 5 or 6 as the same moves over the top of the elevator. This rotation of the arm rotates the sleeve 14 which rotates a disk 13 thereon having a crank pin 13ᵃ connected by a link with a crank 15 on a transversely extending shaft 17 which carries a deflecting arm 18. It will be seen that this turning of the arm 9, alternately raises the deflecting arm and drops it to lowermost position. The movement of the crank 15 is also utilized to operate the counting mechanism which controls the discharging mechanism. To accomplish this a link 19 is attached to the extremity of the arm 15ᵃ of the lever 15, the opposite end of the link being connected to a pivoted lever 24 which carries a pawl 21 which is gravity held in engagement with a ratchet wheel 22, the said ratchet wheel having a second pivoted pawl 25 engaging the same and pivoted to a part of the frame. In this way, as the lever 15 oscillates, the ratchet wheel 22 will be turned by a step-by-step movement, and a mechanism is provided to cause the ratchet wheel to operate the discharging mechanism once every revolution. It may be mentioned that the speed with which the ratchet wheel is turned, and consequently the period of discharge, may be regulated by adjusting the connection of the link 19 with the arm 15ᵃ, this being accomplished by providing a plurality of perforations 23 in the arm with which the lever may be connected.

In order to operate the discharging mechanism from the ratchet wheel 22, a pin 26 is provided on the ratchet wheel, adapted once every revolution to engage and raise a tiltable lever 27 pivoted to the frame and having a tooth 28 thereon which normally engages a like tooth 29 on a pivoted lever 36 mounted on a disk 38 secured to a stub shaft 39 from which the discharging mechanism is operated, as hereinafter explained. Loosely mounted on the shaft 39 is a sprocket wheel 33 connecting with a chain 32, the opposite end of which engages a sprocket 31 on the shaft 30, said sprocket wheel being continuously rotated. On the inner side of the sprocket wheel 33 a plurality of pins 34 are provided, adapted ordinarily to engage a pin 35 provided on the lever 36, the said lever being normally retained in innermost position by means of a spring 37. One of the pins 34 engaging the pin 35 tends to cause the lever 36 to revolve about its fulcrum in a direction which is counterclockwise, as viewed in Fig. 3 and carry it forward at the same time. When, however, the teeth 28 and 29 are in engagement, this is impossible, and in this case, one of the pins 34, causes the lever 36 to rotate clock-wise, so that the said pins may pass under the pin 35. When, however, the teeth are disengaged on account of the lever 27 having been raised by the pin 26 on the ratchet wheel, the pins 34 will carry the disk around with them, rotating the shaft 39 and the pinion 38ᵃ thereon, which pinion is meshed with a corresponding pinion 58ᵃ on the shaft 59 which operates the discharging mechanism. In connection with the diverter arm, it may be noted that as the dumping mechanism is thrown into gear by the counting ratchet wheel 22, which only revolves with the downward stroke of the arm 15 and link 19, it will readily be seen that the diverter arm will be lowered automatically at the same time that the pin 26 engages the lever 27.

To prevent the elevator operating when there is no sheaf on the receiving forks, a lever 40 is provided (refer to Figs. 8 and 9) supported from the frame and having a projection 41 adapted to be engaged by the end of the carrier 5 or 6 as it passes upwardly. The upper end of the lever which will be pressed by the carrier coming in contact with the projection 41, normally rests on a second lever 42 fulcrumed at 26ᵇ spring held in uppermost position by a spring 56, the said lever 42 having a projection 42ᵃ which engages a tooth 43ᵃ on a lever 43, normally preventing tilting of the lever 43, the said lever 43 being fulcrumed at 45 and having associated therewith a spring 44 which normally tends to tilt the end 46 downwardly. When the lever 43 is released by the tilting of the lever 42, the end 46 is moved downwardly and fits into one of a plurality of diagonally cut teeth 47ᵃ on a disk 47, loosely mounted on the shaft 30 and having pins 48 thereon which extend through the sprocket wheel 50, also loose on shaft 30 and a disk 51 secured to and rotated with the shaft 30, the said disk 47 and sprocket 50 being normally pressed against the disk 51 by a spring 49. It will be noticed that the lever 40 rests by gravity on the lever 42 and will be turned to normal position after passage of the carrier by the raising of the lever 42, under action of the spring 56. It will be seen that when the end 46 engages the diagonal teeth, the disk as it rotates will be moved axially, withdrawing the pins 48 from the disk 51 thus freeing the sprocket 50, causing the elevator to cease rotating.

In order to start the elevator as soon as a sheaf comes on the cradle 2, an arm 54 is provided on the shaft $2^a$, adapted to be tilted by the weight of the sheaf on the shaft, the said arm being retained in normal position by a spring 52. This arm 54 is connected by a link 55 with a lever 53, the end of which engages a projection $43^b$ on the lever 43, and thus when the lever 53 is tilted, it restores the lever 43 to normal position, permitting the disk 47 to return to normal position under the spring 49 and thus again throwing the clutch formed by the pin and disk into engagement and causing the elevator to again operate.

Referring next to the mechanism for dumping and discharging the sheaves, it will be observed that as the sheaves are discharged into the receptacle H, they will lie in horizontal position one above the other, and to discharge them, two sets of dumping fingers I and J are provided, each of which sets include pivoted fingers $66^a$, $66^b$, $66^g$ and $66^h$, their position being controlled by means of a cam 66 engaging rollers $66^a$ provided on projections $66^e$ on the fingers, the said fingers being supported from a bracket $66^f$ which is rotated during discharging by means of suitable gears 64 and 65 from shafts 62 and 63 having pinions 60 and 61 thereon which mesh with pinions $60^a$ and $61^a$ on the shaft 59, the gear being such that for a complete revolution of the shaft 59 the fingers will turn only half a revolution. The underside of the brackets $66^f$ are supported by brackets A which are secured to the cams 66. The upper portions of the cams when they are in normal position, are provided with wings B, B′ adapted to draw back the fingers $66^b$ to prevent their interfering with the sheaves as they are discharged between the fingers.

The shape of the cams is so arranged that as the fingers turn from vertical to horizontal position they will be gradually tilted toward each other compressing the sheaves together in the form of a shock. As they pass horizontal position, the cams abruptly drop at points 68 and 69, whereby, when the rollers pass said points, the fingers will be free to return to normal position under the action of the spring 71, the said spring acting against the ends of the fingers $66^g$ and $66^h$ which latter engage pins $66^i$ and $66^j$ carried by the fingers $66^a$ and $66^b$, the sheaves dropping from between the fingers in the form of a shock and passing along the curved steel plate 70 supported from the frame and adapted to guide the bottom of the shock during discharge. It will be seen that this plate is formed with two divergent wings opening in a rearward direction and adapted to form a support which will cause the shock to gradually slide down to the ground along the inclined surface of the plate. It will be noted that the spring 71 bears on the short ends of the arms $66^h$ and $66^g$ beyond their pivoting points in such a way as to tend to cause them to lie parallel with the bracket $66^f$. This movement of the sheaves along the plate is assisted by the ejector 57. This includes a pivoted ejecting arm $57^a$ supported at the extremity of a pivoted rod $57^b$ supported from a suitable bracket on the frame and which is tilted by a link 73, the link 73 being actuated by a mechanism hereinafter described.

To give the proper movement to the arm $57^a$ during tilting, a second link $57^c$ is connected to the same a short distance below the pivoting point and having the opposite extremity connected to a projection $57^d$ on the frame, the movement of the ejecting arm being illustrated by the dotted lines in Fig. 15. The rod 73, is pivoted to a crank 72 formed by a pin 74 passing through collars located on the ends of the shaft 59 where the said shaft is divided, (see Figs. 2 and 6).

In operation, on turning the crank 72, the link 73 is lowered and the ejector raised to the position shown in dotted lines in Fig. 15. At this time the sheaves will be turned by the fingers, and as the sheaves are dropping outwardly, the continued rotation of the crank will lower the ejector arm $57^a$ to normal position and this arm will push against the sheaves in stubbleward direction. The sheaves are normally prevented from dropping to the ground while in the receptacle H by means of a pivoted rack 78, which is pivoted in members $78^a$ of the frame, and it is necessary to tilt this rack downwardly to move it out of the way of the fingers during the turning movement. To accomplish this, a pin 74 is provided on the crank 72 adapted to engage a tilting dog 75, the upper end of which normally prevents tilting of the lever 76, the said lever having a rod 77 pivoted thereto, the lower end of which is connected to an arm $77^a$ on the rack 78. While the shock receptacle is being filled the crank 72 occupies the position as shown in Fig. 6. When the dumping mechanism is set in motion pin 74 engages dog 75 releasing the lever 76 thus allowing the rack 78 to drop. When the shock reaches upright position the fingers 66ª and 66ᵇ open, the shock being deposited and the pin 74 engages tooth 78ˣ restoring the rack 78 to its former position.

It is desirable to provide means for preventing the elevating mechanism from operating while the discharge mechanism is operated, and to accomplish this, a cam 79 is provided on the shaft 59, the said cam engaging the end of a pivoted lever 80, which has an arm 80ª thereon which carries a pivoted arm 81, and when the lever is tilted by the cam, the end of the arm 81 will project into such position that it will be engaged by one of the moving carriers and rotated about its fulcrum 82 in a counter clock-wise direction. This will depress a link 84 by means of a lever 83, the lever 84 operating to tilt the lever 42 and thus throw the clutch out of engagement, as hereinbefore described.

In addition to the means for automatic dumping, as already described, means are provided for dumping by hand. These means comprise a stirrup pinion 88 pivoted to the frame and engaging a pinion 89 carrying a disk 90 which has a spring dog 91 mounted thereon adapted to engage the pin 26 and carry the same around through a complete revolution thereby, operating the dumping mechanism as already described. It is to be noted, in order that this operation should be effected, the pin 26 must extend on both sides of the ratchet wheel. The stirrup pinion is actuated by means of a bar 87 connected to a crank 86 which has a coupling 85 thereon, suitably connected to a shaft operated by a treadle on the binder (not shown). To prevent the diverter 18 remaining in raised position when the machine is dumped manually, a link 92 is provided extending between the stirrup pinion 88 and a plate 93 loosely mounted on the shaft 10, the said plate carrying a spring pawl 94 adapted to normally engage a notch 94ª in the disk 13.

In order to permit adjustment of the position of the cams and dumping fingers to accommodate different lengths of sheaves, or height of stook, or uneven surface of ground, the shafts supporting the sets of dumping fingers I and J are adjustably mounted in slides 98 which slides are mounted on tracks 98ª and 98ᵇ, the said slides being adapted to be adjusted by means of a lever 95 pivoted at 99 having a crank 96 connected with the slide by a link 97. The beveled pinions 64 and 65 are not tightly fastened but move on a feather in the shaft. In order that this may take place, it is necessary to provide means for adjusting the fingers vertically, and these means comprise slides 66ᵐ fitting in a guideway 98ᶜ and carrying the shaft 65ᵇ which connects the pinion 65ª with the bracket 66ᶠ. Any motion of the slide 98 is communicated to a similar slide for the opposite dumping fingers by a similar set of levers and rods (not illustrated).

As many changes could be made in the above construction, and many apparently widely different embodiments of my invention within the scope of the claims could be made without departing from the spirit or scope thereof, it is intended that all matter contained in the accompanying specification and drawings shall be interpreted as illustrative and not in a limiting sense.

What I claim as my invention is:

1. A sheaf shocker comprising a receptacle, an elevator including carriers, a tilting diverter arm located at the end of the elevator and above the receptacle and being tiltable downwardly and upwardly and means automatically operated by each alternate carrier for tilting the arm upwardly to cause the sheaves to fall in the far side of the receptacle and means for turning the arm to normal position.

2. A sheaf shocker comprising a receptacle, an elevator including carriers, a shaft extending across the carriers and having a diverter arm thereon adapted when raised to divert the sheaves in the far side of the receptacle, an arm adapted to be engaged and tilted by the carrier as it passes over the top of the elevator, and mechanism connecting the arm with the shaft supporting the diverter arm whereby, when the arm is tilted, the diverter arm will be actuated.

3. In a sheaf shocker and in combination a receptacle, an elevating mechanism adapted to lift the sheaves and discharge them into the receptacle, a counting mechanism and means automatically thrown into operation by the counting mechanism for discharging the sheaves in the form of a shock, and manually operable means for actuating the discharging mechanism, said means including a tiltable stirrup pinion, a pinion rotated thereby and means operated by the turning of the pinion for releasing the discharging mechanism.

4. A sheaf shocker comprising a receptacle, receiving cradle, a tiltable shaft supporting the same, a crank on the shaft spring held in normal position, adapted to be tilted by the weight of a sheaf on the cradle, an elevator having carriers adapted to carry the sheaf from the cradle, means for automatically stopping the elevator before the carrier on the elevator reaches the cradle, and mechanism operated by the tilting of the said crank for starting the elevator.

5. A sheaf shocker comprising a receptacle, elevating means adapted to discharge the sheaves into the receptacle and dumping mechanism having means to compress the sheaves and turn them to vertical position, an ejecting arm and means for reciprocating the same during dumping of the sheaves.

6. A sheaf shocker comprising a receptacle, elevating means adapted to discharge the sheaves into the receptacle and a dumping mechanism for compressing the sheaves and turning them to vertical position, a pivoted ejecting arm, a tiltable rod supporting the ejecting arm, a pivoted link connected to the ejecting arm below the pivoting point, a fixed support to which the opposite end of the link is pivoted and means operated by the discharge mechanism for reciprocating the rod connected to the ejecting arm.

7. A sheaf shocker comprising a receptacle, elevating means adapted to discharge the sheaves into the same, means for discharging the sheaves from the receptacle, and means operated by the discharging mechanism for stopping the elevator, the said means comprising a cam turned by the discharging mechanism, a lever tilted by the cam, a tiltable member on said lever adapted when the lever is tilted to project before the carriers of the elevator and means operated by the tilting of said member for stopping the elevator.

8. A sheaf shocker comprising a receptacle, elevating means adapted to discharge the sheaves into the receptacle, dumping fingers in the receptacle adapted when actuated to turn the sheaves to vertical position and compress them in the form of a shock, slides supporting the dumping fingers and means for adjusting the position of the slides.

9. In a sheaf shocker and in combination a receptacle, a tiltable diverter arm adapted to cause the sheaves to fall into the far and near sides of the receptacle, an elevator including carriers and means automatically operated by each alternate carrier for tilting the arm to cause the sheaves to fall into the far side of the receptacle.

10. In a sheaf shocker and in combination a receptacle adapted to receive and hold the sheaves in a horizontally extending position, an elevator adapted to lift the sheaves and drop them into the receptacle, a diverter arm adapted when raised to cause the sheaves to fall into the far side of the receptacle and automatically operated means for raising the diverter into operative position when each alternate sheaf is discharged.

11. In a sheaf shocker, a turning mechanism comprising a rotatable bracket, means for rotating the same, a pair of fingers pivoted to said bracket and a fixed cam adapted to engage and move said fingers as the bracket is turned, to cause their extremities to move closer together to grip the sheaves.

12. In a sheaf shocker, a turning mechanism comprising a rotatable member, means for rotating the same, a pair of fingers pivoted to opposite extremities of said member and having projections thereon with rollers on the projections and a fixed cam adapted to be engaged by the rollers, and of such shape as to cause the outer extremities of the fingers to be moved together as the fingers are turned from a vertical to a horizontal position.

13. In a sheaf shocker a turning mechanism comprising a rotatable member, means for rotating the same, a pair of fingers pivoted to opposite extremities of said member and having projections thereon with rollers on the projections, a fixed cam adapted to be engaged by the rollers, and of such shape as to cause the outer extremities of the fingers to be moved together as the fingers are turned form a vertical to horizontal position, and spring means tending to restore the fingers to normal position and causing them to move to said position when the rotatable member is returned to its normal position.

14. In a sheaf shocker and in combination a receptacle, elevating means adapted to discharge the sheaves on to the receptacle, dumping means adapted when actuated to compress and upend the sheaves, an ejector adapted to force the sheaves rearwardly, a depressible member normally supporting the bottom of the sheaves and means for lowering said depressible member during discharge.

15. In a sheaf shocker and in combination a pair of dumping fingers adapted to receive the sheaves in a substantially horizontal position, means for actuating said dumping fingers to cause them to grip the sheaves and cause them to turn to vertical position and means for adjusting said dumping fingers to accommodate different sized sheaves.

16. In a sheaf shocker and in combination a pair of dumping fingers adapted to receive the sheaves in a substantially horizontal position, means for actuating said dumping fingers to cause to grip the sheaves and turn them to a vertical position and means for adjusting the horizontal and vertical position of said dumping fingers.

17. In a sheaf shocker and in combination a pair of dumping fingers adapted to receive the sheaves in a substantially horizontal position having actuating means for turning the sheaves to vertical position, vertically adjustable slides supporting the dumping fingers and means for horizontally adjusting the vertically adjustable slides.

18. In a sheaf shocker, a turning mechanism comprising a rotatable member, means for rotating the same, a pair of fingers pivoted to the opposite extremities of said members having projections thereon, and a fixed cam adapted to be engaged by the projections and being formed with wings adapted to engage the projections and cause the uppermost finger to be tilted inwardly when the fingers are raised to vertical position, whereby, said uppermost finger will be clear of the sheaves entering between the fingers, the shape of the lower portion of the cam being such as to cause the outer extremities of the fingers to be moved together as they are turned from a vertical to horizontal position.

In witness whereof I have hereunto set my hand in the presence of two witnesses.

ALBERT THOMAS GILES.

Witnesses:
S. H. ADAMS,
W. R. McLAURIN.

---

Copies of this patent may be obtained for five cents each, by addressing the "Commissioner of Patents, Washington, D. C."